United States Patent [19]
Dunphy et al.

[11] Patent Number: 5,401,956
[45] Date of Patent: Mar. 28, 1995

[54] DIAGNOSTIC SYSTEM FOR FIBER GRATING SENSORS

[75] Inventors: James R. Dunphy, Glastonbury; Kenneth P. Falkowich, Coventry, both of Conn.

[73] Assignee: United Technologies Corporation, Hartford, Conn.

[21] Appl. No.: 129,217

[22] Filed: Sep. 29, 1993

[51] Int. Cl.6 .............................................. H01J 5/16
[52] U.S. Cl. .......................... 250/227.18; 250/227.23
[58] Field of Search ....................... 250/227.18, 227.23

[56] References Cited

U.S. PATENT DOCUMENTS

| | | | |
|---|---|---|---|
| 4,761,073 | 8/1988 | Meltz et al. | 356/32 |
| 4,806,012 | 2/1989 | Meltz et al. | 356/32 |
| 4,985,624 | 1/1991 | Spillman, Jr. | 250/227.23 |
| 5,323,224 | 6/1994 | Wada | 250/227.18 |

FOREIGN PATENT DOCUMENTS

RM93A0005-97 9/1993 Italy.

Primary Examiner—William L. Sikes
Assistant Examiner—James Dudek
Attorney, Agent, or Firm—Gerald L. DePardo

[57] ABSTRACT

An optical sensor diagnostic system includes a tunable narrow wavelength-band source 9 which provides a variable wavelength light 44 into an optical fiber 32,52. Reflective sensors 54,58, such as Bragg gratings, are disposed along the fiber 52 in the path of the variable light 44. The sensors 54,58 transmit light 56,60 having a minimum transmission wavelength which varies due to a perturbation, such as strain, imposed thereon. A tuner control circuit 42 drives the tunable light source 9 to cause the source light 44 to scan across a predetermined wavelength range to illuminate each sensor at its minimum transmission wavelength. The power of the transmitted light is converted to an electrical signal by a detector 64 and monitored by a signal processor 68 which detects drops in transmitted power level and provides output signals on lines 71 indicative of the perturbation for each sensor. The system may be configured in open loop mode to measure static strains, or closed loop mode to track static strains and measure dynamic strains. Also, the system may be used in a Fabry-Perot configuration to provide a very sensitive strain detection system. Further, the system may be configured in reflection or transmission mode.

31 Claims, 5 Drawing Sheets

DIAGNOSTIC SYSTEM FOR FIBER GRATING SENSORS

TECHNICAL FIELD

This invention relates to systems using optical fiber Bragg grating and, more particularly, to specific system configurations for use with such fiber grating technology.

BACKGROUND ART

It is known that Bragg gratings impressed in optical fibers may be used to detect perturbations, such as, strain or temperature, at the location of the gratings, such as is described in U.S. Pat. Nos. 4,806,012 and 4,761,073 both to Meltz et al. In such a sensor, the core of the optical fiber is written with periodic grating patterns effective for reflecting a narrow wavelength band of light launched into the core. Spectral shifts in the transmitted and reflected light indicate the intensity of strain or temperature variations at positions of the grating corresponding to the associated wavelengths of the injected light. However, while it is known that the reflectivity (or transmission) wavelength profile (or spectrum) of the gratings shift as a function of an applied perturbation to the grating area, to date, a practical, whole system, using such fiber Bragg gratings, has not yet been discussed.

Thus, it would be desirable to provide a system for detecting the wavelength shift of fiber Bragg gratings that occurs due to static or dynamic strain, acoustic perturbations or other perturbations.

DISCLOSURE OF INVENTION

Objects of the invention include provision of a diagnostic system which interfaces which optical fibers having Bragg grating sensors embedded therein for determining static and dynamic perturbations.

According a first aspect of the present invention, an optical sensor diagnostic system includes tunable light source means for providing a wavelength-tunable light in response to a tuner control signal, the tunable light being launched into an optical waveguide; at least one optical sensor means, disposed in the path of the tunable light, each providing a transmitted light having an associated minimum transmission wavelength, the minimum wavelength varying in response to a perturbation imposed on a corresponding sensor; the tunable light source means for individually illuminating each of the sensor means at the associated minimum transmission wavelength; optical isolation means, disposed in the path of the tunable light between the tunable light source means and the sensor means, for isolating the variable light source means from light reflected from the sensor means; optical detection means, disposed in the path of the transmitted light, for detecting the transmitted light from each of the sensor means and for providing an electrical detection signal indicative of the power of the transmitted light; tuner control means for providing a variable voltage signal to the tunable light source means indicative of the desired wavelength of the tunable light; and signal processing means responsive to the electrical detection signal, for detecting a shift in the minimum transmission wavelength due to the perturbation, and for providing a signal indicative of the perturbation for each of the sensor means.

According to a second aspect of the invention, an optical sensor diagnostic system includes tunable light source means for providing a wavelength-tunable light in response to a tuner control signal, the tunable light being launched into an optical waveguide; at least one optical sensor means, disposed in the path of the tunable light, each providing a reflected light having an associated local-maximum peak reflection wavelength, the peak wavelength varying in response to a perturbation imposed on a corresponding sensor; the tunable light source means for individually illuminating each of the sensor means at the associated peak wavelength; optical isolation means, disposed in the path of the tunable light between the tunable light source means and the sensor means, for isolating the variable light source means from the reflected light; optical detection means, disposed in the path of the reflected light, for detecting the reflected light from each of the sensor means and for providing an electrical detection signal indicative of the power of the reflected light; tuner control means for providing a variable voltage signal to the tunable light source means indicative of the desired wavelength of the tunable light; and signal processing means responsive to the electrical detection signal, for detecting a shift in the minimum wavelength due to the perturbation, and for providing a signal indicative of the perturbation.

According to a third aspect of the present invention, an optical sensor diagnostic system includes tunable light source means for providing a wavelength-tunable light in response to a tuner control signal, having a front variable-wavelength reflector delimiting one end of the cavity of the source means, the tunable light being launched into an optical waveguide; at least one optical sensor means, disposed in the path of the tunable light, the sensor having an associated peak reflection wavelength, the peak wavelength varying in response to a perturbation imposed on a corresponding sensor, each sensor acting as a reflector for an associated coupled cavity between the front reflector and a corresponding one of the sensor means; the coupled cavity resonating at the associated peak reflection wavelength and providing an output light indicative of the peak wavelength; the perturbation causing the coupled cavity to detune thereby causing the power of the output light to change accordingly; the tunable light source means for individually illuminating each of the sensor means at the associated peak reflection wavelength; optical detection means, disposed in the path of the output light, for detecting the output light from each coupled cavity associated with each of the sensor means and for providing an electrical detection signal indicative of the power of the output light; tuner control means for providing a variable voltage signal to the tunable light source means indicative of the desired wavelength of the tunable light; and signal processing means responsive to the electrical detection signal, for detecting a shift in the peak wavelength due to the perturbation, and for providing a signal indicative of the perturbation for each of the sensor means.

The invention provides a workable, practical diagnostic system which functions in cooperation with remote optical fiber Bragg grating sensors to measure static strain, dynamic strain and/or acoustic/vibratory perturbations of items or structures. The remote sensors may be disposed on structures made of metal, plastic, composite, or any other materials that expand, contract, or vibrate, or the sensors may be embedded within such structures. The invention also provides a smooth wavelength tunable laser diode transmitter using an external cavity controlled by a fiber grating. The invention provides individual illumination of each sensor, thereby allowing all the source power to be resident in a single wavelength, or small wavelength band. As a result, the reflected or transmitted light from each grating has a high intensity, thereby providing a signal-to-noise ratio of such reflected or transmitted light which is much grater than systems which illuminate all sensors at the same time using a broadband source.

Another feature of the invention is the ability to switch the system configuration to implement different diagnostic functions. Various embodiments of the invention include detecting a wavelength shift in a closed-loop or open-loop transmission mode as well as in a reflection mode. Also, the invention may be configured in a coupled-cavity Fabry-Perot configuration to detect perturbations along various lengths of the optical waveguide.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
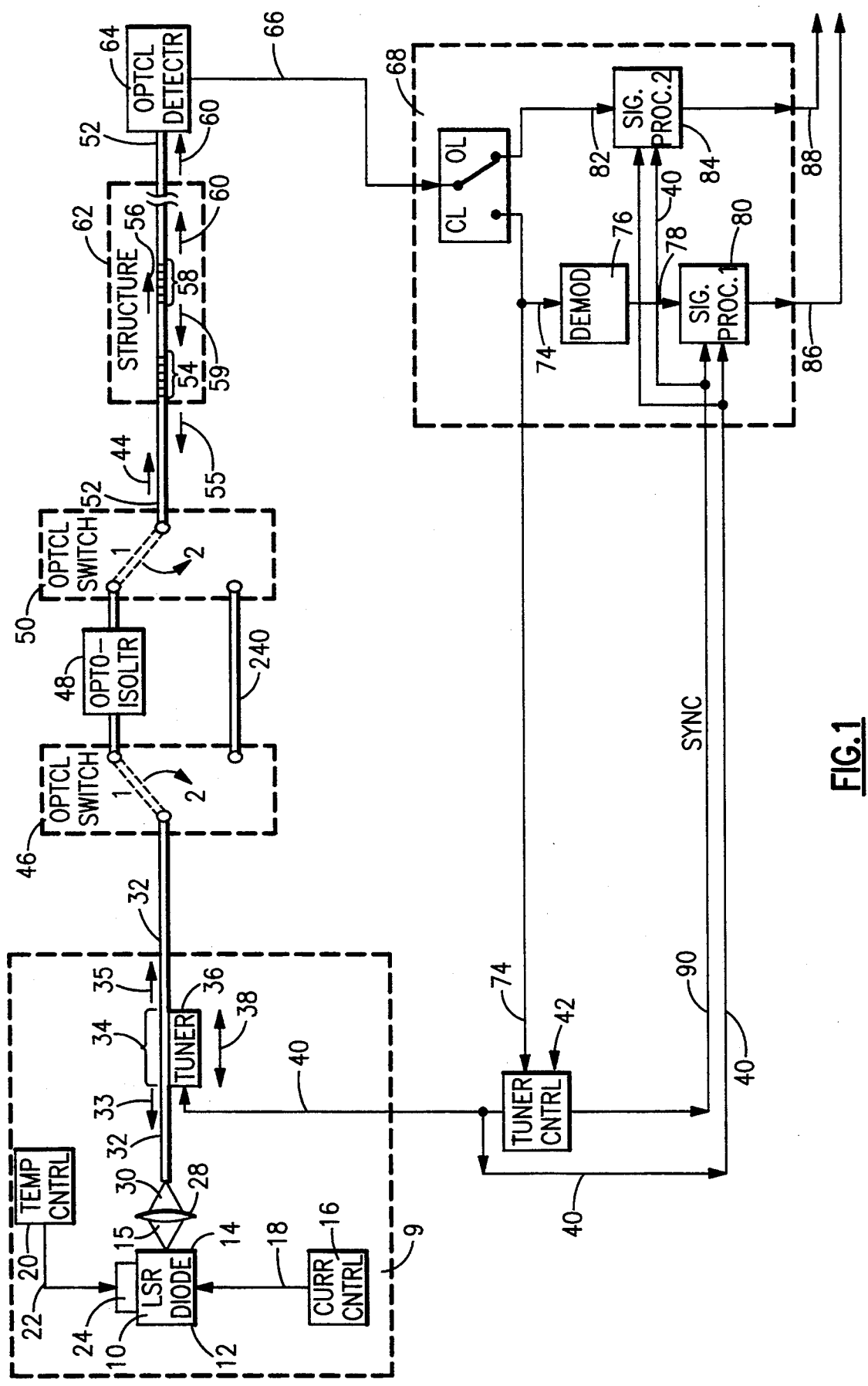
FIG. 1 is a schematic block diagram of a first state of a fiber grating sensor diagnostic system capable of determining static strain in accordance with the present invention.

Referring to FIG. 1, a tunable narrow wavelength-band light source 9 comprises a laser diode 10, e.g., part No. LTO-15-MDO by Sharp, which has a rear facet 12 and a front facet 14 which typically delimit the laser diode resonator cavity. The front facet 14 is coated with an anti-reflection (AR) coating which minimizes the internal reflection of light back into the laser diode cavity as output light 15 passes through the front facet 14 (discussed hereinafter). A current control circuit 16 provides a current signal on a line 18 to the laser diode 10 which controls the intensity of the output light 15. Adjusting the current through the diode also causes slight changes in wavelength, however, this effect is not significant for this application. Also, a temperature control circuit 20 provides a voltage signal on a line 22 to a thermoelectric (TE) cooler 24 to adjust the temperature of the laser diode 10 and thereby adjust the center frequency of the output light 15 which exits therefrom. Other devices may be used to control the temperature if desired.

The laser diode 10 provides the divergent output light beam 15 to a focusing lens 28 which provides a focused light 30 to an optical fiber 32. The lens 28 may instead be a lens system which provides this function. The light 30 propagates along the fiber 32 to a fiber grating 34, e.g., a Bragg grating, which reflects a predetermined amount of a narrow wavelength band of light 33 and allows the remaining wavelengths and a predetermined amount of the narrow band wavelength to pass therethrough as indicated by a line 35.

Because the front facet 14 has the aforementioned AR coating, the rear facet 12 of the laser diode 10 and the fiber grating 34 form an extended laser diode cavity. Attached to the fiber grating 34 is a piezoelectric (PZT) actuator 36 (or tuner) which expands and contracts as indicated by arrows 38 in response to a variable voltage signal on a line 40 from a tuner control circuit 42 (discussed hereinafter). The tuner 36 causes a change in grating spacing (and a change in refractive index) which causes the central reflection wavelength of the grating to vary. In effect, the tuner 36 stretches and contracts the fiber grating spacing thereby changing the output wavelength of the laser delimited by the cavity mirrors 12,34. Because of the amplification which occurs in the laser diode, the highest power wavelength of the output light 35 will be the wavelength of the reflected light 33. Thus, the narrow lasing wavelength of the output light 35 varies as a function of the signal on the line 40 applied to the tuner 36.

The light 35 propagates along the fiber 32 to an optical switch 46 which, when positioned in the state labeled 1, connects the fiber 32 to an optical isolator 48. The output of the optical isolator 48 is connected to another optical switch 50 which is in a state labeled 1 which optically connects the output of the optical isolator to an optical fiber 52. The optical switches 46,50 may alternatively be manual optical fiber patch cords.

The light 44 propagates along the fiber 52 to a fiber grating 54 which reflects a predetermined narrow wavelength band of light 55 and passes the remaining wavelengths as a light beam 56. The light 56 passes to another fiber grating 58, having a central reflection wavelength different from that of the fiber grating 54. The grating 54 reflects a narrow wavelength band of light 59 and passes the remaining wavelengths as indicated by a line 60.

The fiber 52 and the fiber gratings 54,58 may be bonded to or embedded in a structure 62 which is being monitored for a perturbation change, such as, dynamic or static strain and/or temperature. The structure may be made of metal, plastic, composite, or any other materials and the sensors may be disposed on or within the structure. It should be understood that even though only two gratings 54,58 are shown in FIG. 1, any number of gratings may be located along the fiber 52.

The light 60 exits from the grating 58 and propagates along the fiber 52 to an optical detector 64. The optical detector 64 provides an electrical detection signal on a line 66 indicative of the optical power incident thereon to a feedback control circuit 68.

The electrical signal on the line 66 is fed to an electrical switch 72 having an open-loop (OL) and a closed-loop (CL) position. The CL output of the switch 72 is fed to the control circuit 42 and to an electronic demodulator 76, e.g., an asynchronous demodulator, on a line 74. The demodulator 76 provides a demodulation signal on a line 78 to a closed-loop signal processor 80. The OL output of the switch 72 is fed to an open loop signal processor 84 on a line 82.

The signal processing circuits 80,84 (discussed hereinafter) analyze the electrical signals and provide a plurality of output electrical perturbation signals on lines 86,88, respectively, indicative of the strain being measured by the sensors within the structure 62. It should be understood that a single line which is time multiplexed or that provides serial digital data on each sensor may also be used.

Also, a synchronization signal (discussed hereinafter) on a line 90 and the tuner control signal on the line 40, are provided from the tuner control circuit 42 to the signal processing circuits 80,84.

When the system is configured in open loop mode for measuring static strain, the optical switches 46,48 are in position 1, the switch 72 is in the open-loop (OL) position, and the tuner control logic 42 and the signal processing logic 84 function as follows.

Figure 2A:
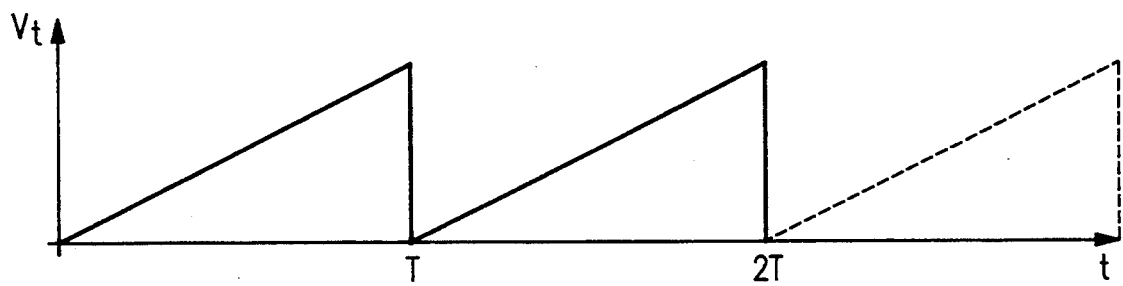
FIG. 2 is a series of three graphs (a,b,c) showing a voltage $V_t$ applied to a tuner and an output wavelength $\lambda_s$ of a tuned source, both as a function of time, and an output power spectrum as a function of both time and wavelength, in accordance with the present invention.
Figure 2B:
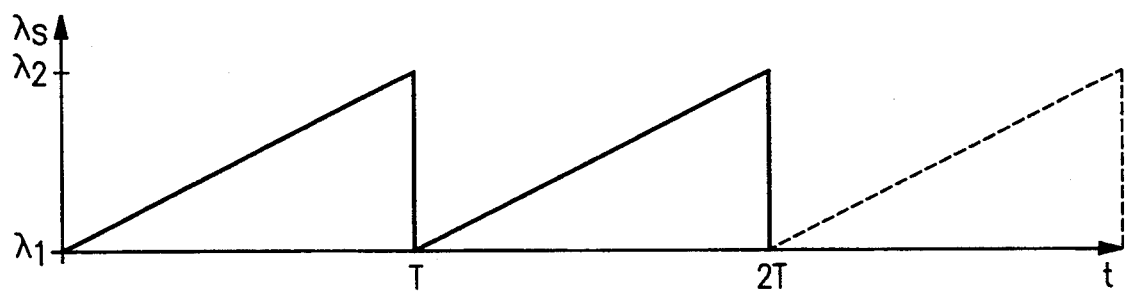
Figure 2C:
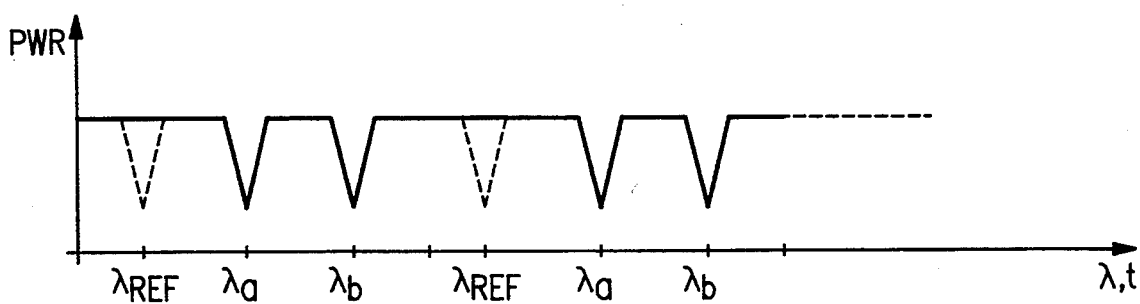
Figure 3:
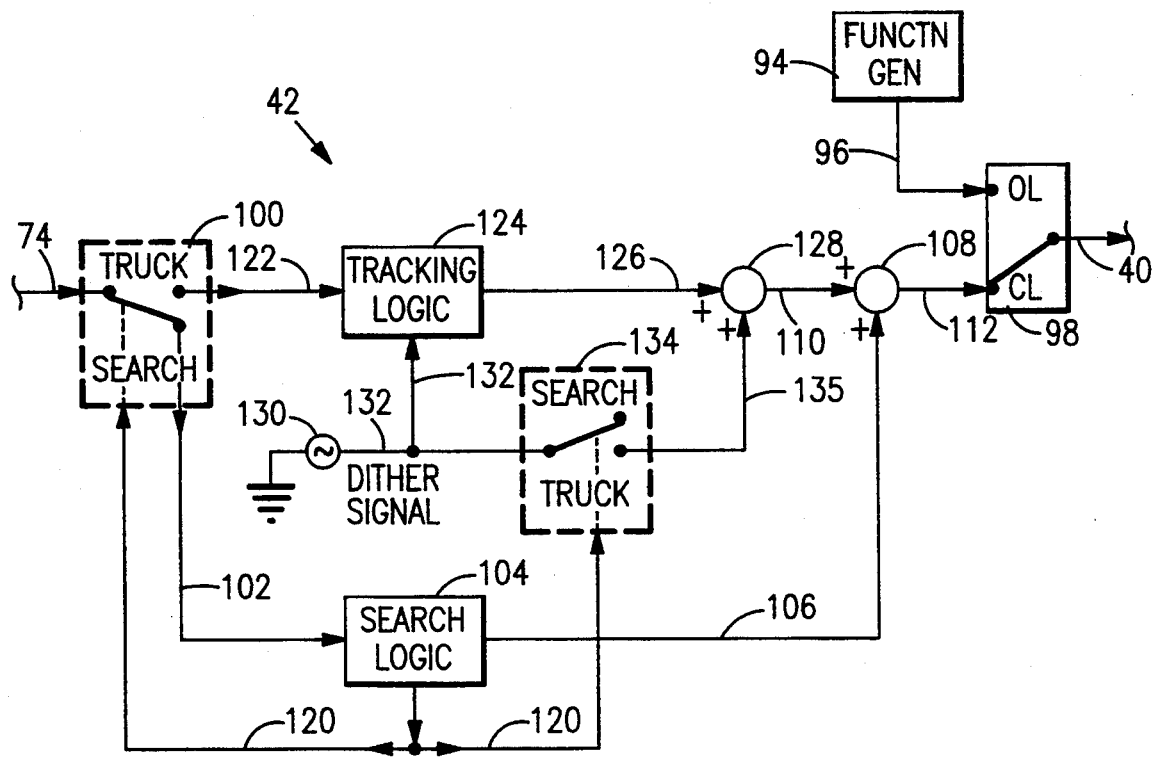
FIG. 3 is a schematic block diagram of a tuning control circuit of FIG. 1, in accordance with the present invention.

Referring now to FIGS. 2 and 3, the tuner control circuit 42 (FIG. 1) comprises a function generator 94 (FIG. 3) which provides an output voltage signal $V_t$ on a line 96 to a switch 98. The switch 98 is in the OL position which connects the function generator 94 to the line 40 to drive the tuner 36. The function generator 84 provides an output voltage $V_t$ which is a sawtooth waveform having a predetermined period T, as is indicated by illustration (a) of FIG. 2. The voltage $\lambda_t$ relates directly to the expansion or contraction of the tuner 36 (FIG. 1) thereby causing the output source wavelength $\lambda_s$ of the output light 35 to vary in proportion to the applied voltage $V_t$ as indicated by the sawtooth waveform in illustration (b) of FIG. 2. Thus, the wavelength $\lambda_s$ of the light 35 varies linearly from $\lambda_1$ to $\lambda_2$ which range includes a central or peak reflection wavelength $\lambda_a$ of the sensor 54 and central reflection wavelength $\lambda_b$ of the sensor 58.

As a result of the scan through the wavelengths, the optical signal 60 at the input to the optical detector 64 as well as the electrical signal 66 will appear as indicated in illustration (c) of FIG. 2. In particular, the electrical feedback signal on the line 66 will experience a sharp reduction in power centered at the central wavelength $\lambda_a$ of the sensor 54 and at the central wavelength $\lambda_b$ for the sensor 58.

When the system is configured in this open loop mode, the signal processing circuit 84 determines the static strain by determining at what wavelength the reductions in signal level occur, determining the amount of change from the unstrained wavelength, and knowing the relationship between a change in strain and a change in wavelength. The wavelength value is determined by monitoring the tuner control signal on the line 40. Because this signal is directly related to the wavelength of the source light 44, this signal provides a direct proportional indication of the current wavelength value.

Alternatively, the synchronization (sync) signal on the line 90 is provided to the signal processing circuit 68 at the beginning of each ramp (or scan) of the tuner control voltage signal on the line 40 thereby providing a synchronization point from which the signal processing circuit may determine the elapsed time. Because the ramp rate is known for the tuner drive signal, the wavelength at which each dip occurs can be calculated and tracked as the strain on any given sensor changes. The sync signal may instead be provided only at the beginning of the first ramp, if desired.

Also, alternatively, instead of providing the tuner control signal on the line 40 or the sync signal on the line 90, an additional unstrained or unperturbed reference grating (not shown in FIG. 1) may be used having a central reflection peak at $\lambda_{ref}$ which is always located at the same wavelength position. Knowing the predetermined ramp rate of the tuner drive signal together with such a reference wavelength provides the signal processing circuit with sufficient information to synchronize with the beginning of each new ramp. Still other techniques may be used to determine the value of the wavelength at which the power reduction occurs for each sensor.

The system of FIG. 1 may alternatively be configured in a closed-loop mode of operation and used to measure dynamic strain. In such a case, the switch 72 is set to the closed-loop (CL) position and the tuner control circuit 42 and the signal processing circuit 80 function as follows.

Referring now to FIG. 3, the electrical feedback signal on the line 74 from the optical detector from the switch 72 is fed to a switch 100 having a "tracking" position and a "search" position or mode. When in the search mode, the switch 100 is in the "search" position and the feedback signal on the line 74 is connected to a line 102 to a search logic circuit 104 comprising known electronic parts such as op-amps and transistors. The search logic 104 provides a ramp voltage signal similar to that of FIG. 2 Illustration (a) which incrementally increases the voltage applied to the tuner 36 (FIG. 1) thereby increasing the wavelength of the source light 44 (FIG. 1). The search logic 104 provides an output signal on a line 106 to a summing junction (summer) 108. This signal is added to an output signal from other logic (discussed hereinafter) on a line 110 at the summer 108 and the summer 108 provides an output signal on a line 112. The line 112 is fed to the open-loop/closed-loop switch 98, which in this mode of operation, is in the closed-loop (CL) position, which ultimately provides the output drive signal on a line 40 to the tune of 36.

Figure 4:
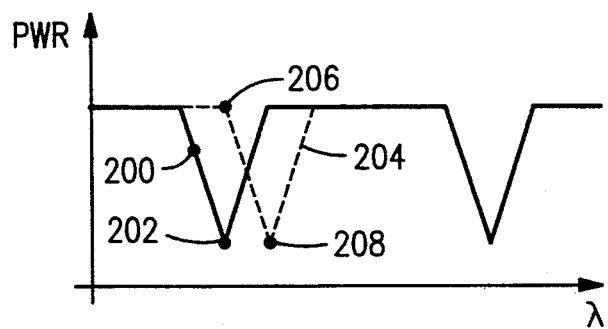
FIG. 4 is a graph of a transmission power profile of a grating sensor in accordance with the present invention.

The search logic 104 monitors the feedback signal on the line 74 for a reduction in the power of the signal such as that shown as a point 200 of FIG. 4. When the dip in power is sensed by the search logic 104, the search logic 104 provides a signal on a line 120 to the switch 100 and a switch 134 to switch from the search mode to the track mode.

In the track mode, the feedback signal on the line 74 is provided through the switch 100 to a line 122 which is fed to a tracking logic circuit 124 comprising known electronic parts, such as op-amps and transistors. The tracking logic 124 provides a tracking signal on a line 126 to a summer 128. An AC dither signal is provided by an AC source 130 on a line 132 to the switch 134 and to a line 135 which is fed to the summer 128. The dither signal on the line 132 is an AC signal having a predetermined fixed amplitude and frequency (discussed hereinafter). The dither signal acts as an amplitude modulation (discussed hereinafter) to allow the tracking logic 124 to operate.

The tracking logic 124 monitors the dither component of the feedback signal on the line 122 and drives the tuner signal on the line 40 to a wavelength associated with the local minimum peak of the power curve as indicated by a point 202 in FIG. 4. This is accomplished by monitoring the feedback signal on the line 122 and locking on to the dither frequency using the dither signal on the line 132 as a reference signal. The tracking logic 124 determines the magnitude and phase of the dither component of the feedback signal. When the system is dithering about the point 202, the magnitude of the dither component is zero (or very small) because of the shape of the sensor spectrum. In particular, the dither frequency component is doubled due to the symmetry of the sensor shape at the minimum point. If the static strain changes to a new value, this shifts the spectrum (or profile) as indicated by a curve 204, and the operating point shifts to a point 206. At that point, the sign of the phase difference between the dither component of the feedback signal and the dither reference signal on the line 132 indicates which direction for the tracking logic 124 to drive the tuner 36 (FIG. 1) toward a wavelength at a point 208 (at the local minimum of the curve 204). The tracking logic then drives the tuner 36 to the point 208, where the magnitude at the dither frequency again goes to zero.

Thus, the tracking logic 124 acts as a lock-in amplifier and tracks the DC change in the sensor response characteristic associated with static strain changes. Other control configurations may be used provided it acts as a lock-in amplifier on the desired operating point.

Figure 5:
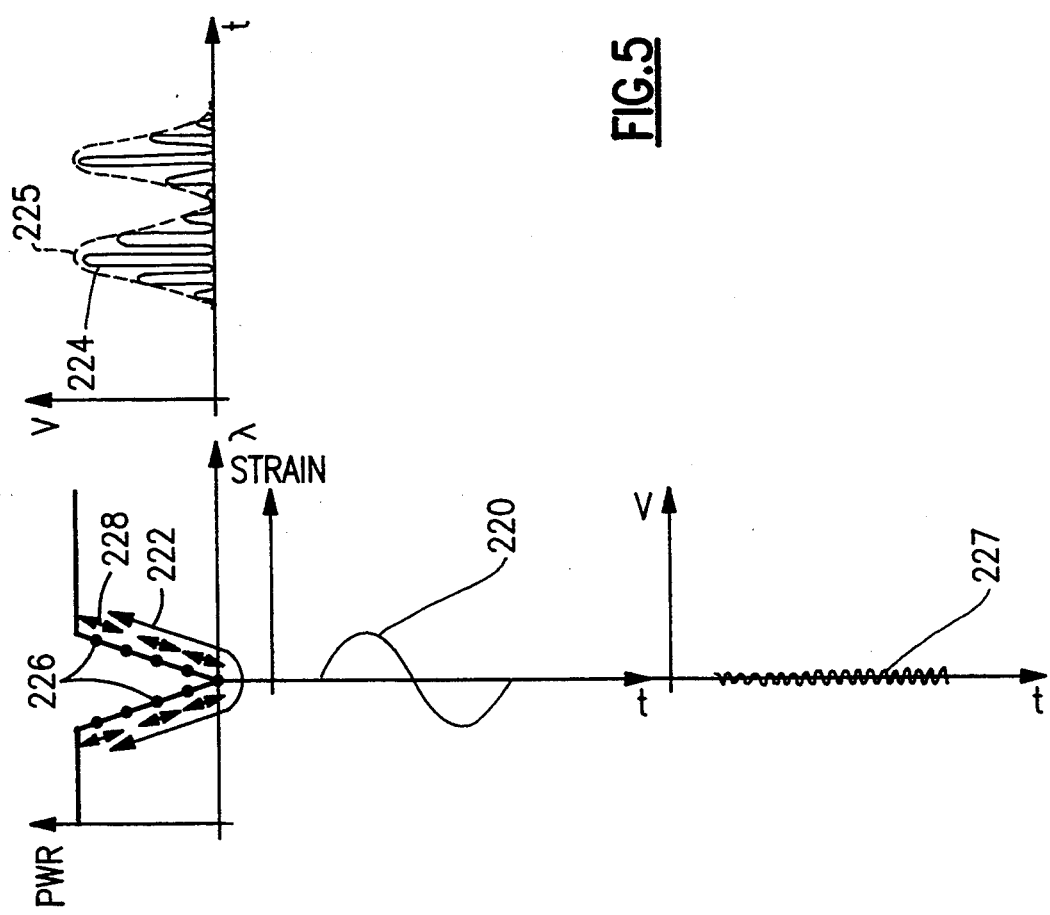
FIG. 5 is a graph showing a transmission power profile of a grating and an input dynamic strain signal and modulation signal and an amplitude modulated output sensor signal, in accordance with the present invention.

Referring now to FIG. 5, if a dynamic (or AC) strain having a low frequency, e.g., about 50 Hz, and amplitude, e.g., about 50 microstrains corresponding to 0.05 nanometers, is applied to the system, such as that indicated by a waveform 220, and the static strain remains fixed (for the sake of illustration), the sensor profile oscillates about the operating point, which can be viewed as the operating point oscillating about both sides of the sensor profile as indicated by an arrow 222. For best performance, the amplitude of the dynamic strain should be limited to the full-width-half-max of the sensor profile, e.g., 0.2 nm or 200 microstrains; however larger strains may be used if desired.

The resulting output waveform 224 has an envelope 225 having a frequency which is twice that of the dynamic strain, due to the shape of the sensor response function. The dither signal is indicated by a waveform 227 and by arrows 228 at points 226 along the sensor profile. The dither signal causes a corresponding amplitude modulation of the dynamic strain signal, as indicated by the waveform 224.

It should be understood that the frequency and amplitude of the dither (or carrier) component of the output signal 224 also has a frequency component of twice the dither frequency due to the symmetrical nature of the sensor profile (as discussed hereinbefore). The amplitude of the dither and dynamic strain signals will effect the shape of the output waveform 224. Also, whether the system is operating closed-loop on the minimum transmission point also has an effect on the shape of the output waveform 224.

The purpose of dithering the signal is to provide a reliable AC signal to allow the tracking logic 124 to track the notch in the sensor profile when changes occur in the static DC strain, even when there is no AC dynamic strain present. Also, the dither amplitude should be greater than the noise level in the system to allow proper tracking to occur and is typically on the order of the amplitude of the strain signal. Further, the dither frequency, e.g., 1 k Hz, should also be set to be greater than the control response of the tracking logic 124 and greater than the dynamic AC signal being measured.

Referring again to FIG. 1, when the system is in closed-loop (CL) operation, the feedback signal on the line 74 is fed to the demodulator 76 operating at the dither frequency, which demodulates the feedback signal in a known way to remove the amplitude modulation caused by the dither (or modulation) signal and provides a demodulated AC signal on the line 78, having an amplitude related to the dynamic strain and a frequency of twice the dynamic strain, to the signal processing logic 80. For example, the demodulator 76 may comprise a bandpass filter centered at the dither frequency and passing the modulation sidebands, a full wave rectifier, and a low pass filter.

The signal processing logic 80 detects the frequency and amplitude of the demodulated signal on the line 78 and provides dynamic strain signals on the lines 86. The dynamic strain is calculated by taking one-half of the frequency and the amplitude is directly proportional to the magnitude of the dynamic strain.

Furthermore, the signal processing circuit 80 monitors the tuner drive signal on the line 40 to determine which of the sensors is being analyzed because the voltage is proportional to the waveguide of the light 44, and the waveguide range of each sensor is known. The dither on the tuner control signal in tracking mode is of minimal effect because of its small amplitude.

Alternatively, the signal processing circuit 80 monitors the sync signal on the line 90 from the tuner control circuit 42 to provide synchronization to determine which of the sensors is being analyzed at a given time. For example, the switching signal on the line 120 may be used as the sync signal because it indicates that it has found the next sensor when the search logic 104 switches from search mode to tracking mode.

Referring back to FIG. 3, when the tracking logic has tracked the notch of the sensor profile for a predetermined period of time, e.g., 100 milliseconds, the search logic 104 again takes control of the tuner drive signal and switches the switch 100 and the switch 134 to the "search" position thereby disabling the dither signal from the tuner drive signal and allowing the search logic 104 to search for the next notch in the grating sensor profile indicated by a dip in feedback signal, as described hereinbefore. Furthermore, the tracking logic control signal on the line 126 is maintained at the position at which it stopped tracking and the search logic 104 begins incrementally from that position to insure a smooth transition to the notch associated with the next grating sensor.

It should be understood that the demodulator 76 may be placed at the input to the switch 72, thereby demodulating the feedback signal on the line 66 all the time. In that case, the dither signal need not be switched out of the circuit in search mode. However, an additional demodulator may likely be needed if the tuner control signal on the line 40 is used by the signal processing circuits 80,84.

Referring back to FIG. 1, the system may also be configured in a Fabry-Perot type coupled cavity configuration. In such a configuration, the optical switches 46,50 are placed in the number two position thereby removing the optical isolator from the optical path of the light 44. In that case, an optical fiber 240 connects the two switches 46,50 and the grating sensor 54 acts as a coupled cavity with the grating 34 and the rear facet to the laser diode 12.

It is known in the art of coupled cavities that the frequency of oscillation is related to the distance between the secondary cavity mirror 54 and the primary cavity mirror 34. In particular, the sensor 54 is located a predetermined distance from the cavity mirror 34 (i.e., the grating 34) such that the coupled cavity will resonate at a predetermined frequency.

As a strain is applied to the sensor 54 and its peak reflection wavelength shifts, the amount of reflection at the predetermined resonance frequency is reduced thereby "detuning" the cavity. This creates a severe rolloff in intensity as a function of applied strain thereby creating an extremely sensitive detector. A similar coupled cavity effect occurs for the grating 58, and any other gratings on the fiber 52. Thus, the Fabry-Perot configuration provides a very highly sensitive configuration for detecting dynamic strain.

Also, it should be understood that the Fabry-Perot configuration may be used to include longer or shorter lengths of fiber that may or may not include a sensor. For example, if the sensor 58 is the outermost sensor along the structure 62, it would delimit a coupled cavity which includes the entire length of fiber and hence the entire length of the structure 62. Thus, if a strain occurred anywhere along the structure, it would de-tune this long coupled-cavity and thus indicate a strain had occurred somewhere along the fiber.

Once having determined that a strain occurred somewhere along the fiber, the system may perform a more detailed interrogation along the length of the fiber to determine precisely where the strain occurred. To determine where along the structure the strain occurred, sensors located at locations successively closer to the opposite end of the structure can be examined to see if they are also detuned. Upon reaching a sensor cavity that is not de-tuned, the strain is between that sensor and the next adjacent sensor. Alternatively, the system may switch to the direct transmission (or reflection) mode (with the switches 46,50 in the position 1), and interrogate each sensor individually as discussed hereinbefore.

The Fabry-Perot configuration is utilized in the closed-loop configuration and thus may use the same tracking and search configuration of FIG. 3, described hereinbefore. The Fabry-Perot sensing technique may also be performed in open-loop operation; however, if a grating drifts out of range, significant sensitivity is lost.

Figure 6:
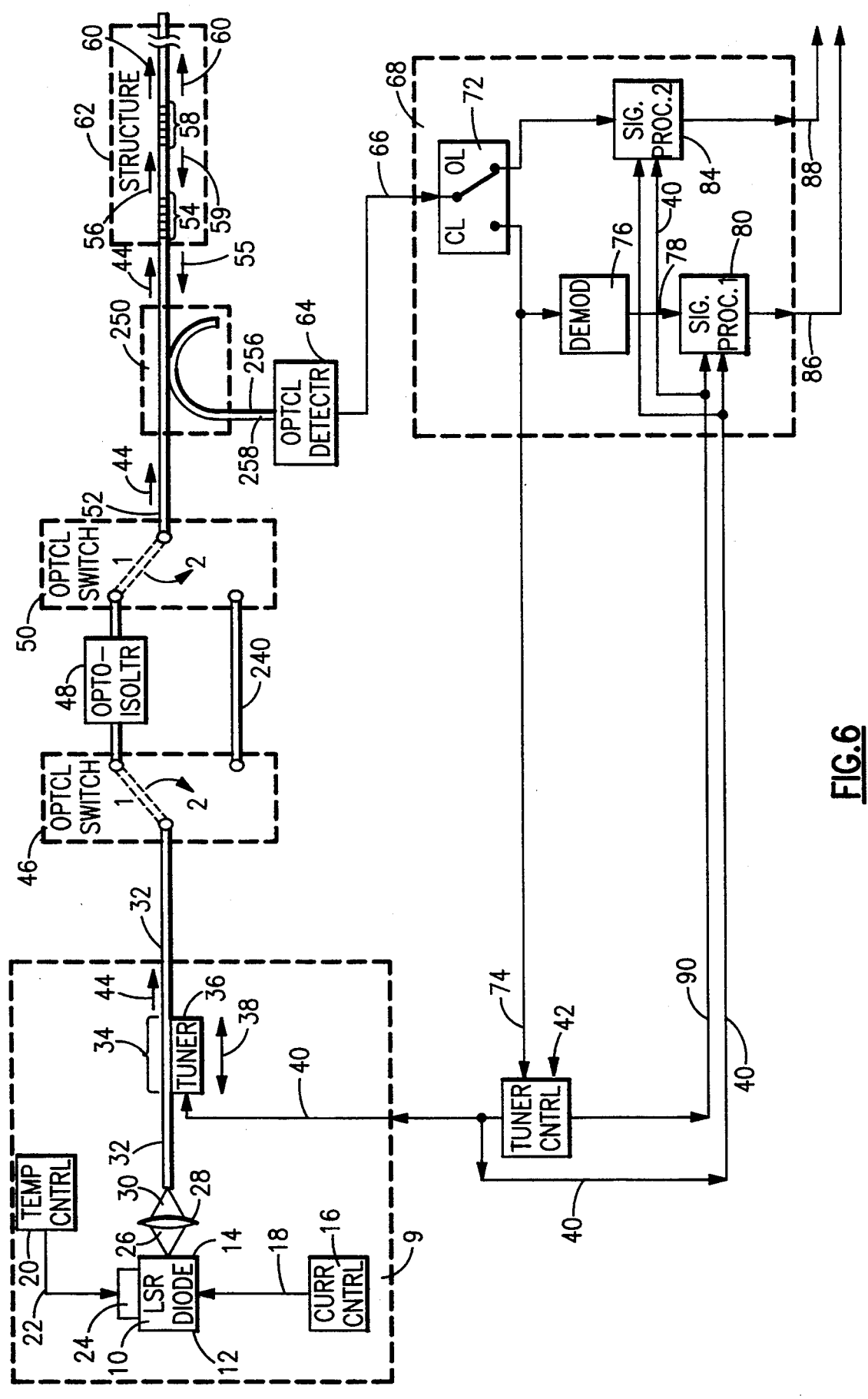
FIG. 6 is a schematic block diagram of a fiber grating sensor diagnostic system configured in a reflection mode of operation for tracking wavelength shifts in Bragg grating sensors in accordance with the present invention.

Referring now to FIG. 6, alternatively, the invention may be configured in a reflection mode instead of a transmission mode. In such a case, the configuration is essentially the same as previously discussed with FIG. 1; however, a 2×2 coupler 250 is provided between the optical switch 50 and the structure 62. As discussed hereinbefore, the sensor 54 reflects a narrow wavelength band of light 55 and passes the remaining light as indicated by the line 56. The remaining light 56 is incident on the sensor 58 which reflects the narrow wavelength band of light 59 and passes the remaining light 60. The reflected light 55,59 is reflected back into the coupler 250 and exits from a port 256 along a fiber 258 to the optical detector 64. The detector 64 provides an electrical signal on the line 66 indicative of the reflected power as opposed to the transmitted power discussed hereinbefore with respect to FIG. 1.

The only substantial difference between the reflection mode configuration of FIG. 6 and the transmission mode configuration of FIG. 1 is that for the sensor profiles in FIGS. 2(c), 4 and 5, instead of the output power being at a constant high level and having a decreasing notch, the power is at a constant low level and has an increasing notch. All other effects are essentially the same and can easily be extrapolated from the discussion hereinbefore. Also, regarding the Fabry-Perot mode, if used in reflection mode, the optical effects of the coupler on the cavity must be taken into account and no stray reflection should exist from the coupler back into the cavity.

For situations where the fiber 52 can only be accessed at one end, the configuration shown in FIG. 6 is the best embodiment; however, if both ends of the fiber are available and accessible, then either the configuration in FIG. 1 or FIG. 6 is equally acceptable.

Also, even though the invention has been described as being used to detect strain, it should be understood that any perturbation or measurand may be measured provided it causes a change in the reflectivity (or transmission) profile, as discussed in aforementioned U.S. Pat. Nos. 4,806,012 and 4,761,073, both to Meltz et al. For example, the fiber may be coated with a material that causes expansion or contraction due to exposure to electric or magnetic fields or certain chemical compositions or other perturbations.

Even though the invention has been described as using Bragg gratings as the sensors that detect the perturbation, any reflective device having a narrow reflection wavelength-band that shifts with applied stress may be used if desired. Also, the sensors need not be impressed in the same type of fiber as the fiber that feeds the sensors, e.g., the sensors may be spliced into the fiber.

Also, although the invention has been described as employing an optical fiber, any other form of optical waveguide may be used if desired. Further, the electrical switches 72 (FIG. 1), 98 (FIG. 3) may be manually controlled or controlled by another signal processor (not shown) such as a microprocessor or CPU in response to commands from an operator or pilot or switched a predetermined rates or under predetermined logical conditions to determine static strain, dynamic strain, and/or perform the strain analysis on the whole fiber (in Fabry-Perot mode).

Also, it should be understood that the tuner control circuit 42 and the signal processing circuit 68 may also be done in software with the appropriate hardware interfaces, e.g., with A/D converters.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An optical sensor diagnostic system, comprising:
    tunable light source means for providing a wavelength-tunable light in response to a tuner control signal, said tunable light being launched into an optical waveguide;
    at least one optical sensor means, disposed in the path of said tunable light, each providing a transmitted light having an associated minimum transmission wavelength, said minimum wavelength varying in response to a perturbation imposed on a corresponding sensor;
    said tunable light source means for individually illuminating each of said sensor means at said associated minimum transmission wavelength;

optical isolation means, disposed in the path of said tunable light between said tunable light source means and said sensor means, for isolating said tunable light source means from light reflected from said sensor means;

optical detection means, disposed in the path of said transmitted light, for detecting said transmitted light from each of said sensor means and for providing an electrical detection signal indicative of the power of said transmitted light;

tuner control means for providing a variable voltage signal to said tunable light source means indicative of the desired wavelength of said tunable light; and signal processing means responsive to said electrical detection signal, for detecting a shift in said minimum transmission wavelength due to said perturbation, and for providing a signal indicative of said perturbation for each of said sensor means.

2. The optical sensor diagnostic system of claim 1 wherein said tuner control means comprises tracking means, responsive to said electrical detection signal, for adjusting said tuner control signal to allow said tunable light to track static changes in said minimum transmission wavelength for each of said sensor means.

3. The optical sensor diagnostic system of claim 2 wherein said tuner control means comprises modulation means for modulating said tuner control signal at a predetermined modulation frequency.

4. The optical sensor diagnostic system of claim 3 wherein said signal processing means comprises demodulation means running at said modulation frequency, for demodulating said electrical detection signal and for providing a demodulation signal indicative thereof.

5. The optical sensor diagnostic system of claim 2 wherein said signal processing means comprises means for measuring the frequency and magnitude of dynamic shifts in said minimum transmission wavelength.

6. The optical sensor diagnostic system of claim 1 wherein said signal processing means comprises means for measuring static shifts in said minimum transmission wavelength.

7. The optical sensor diagnostic system of claim 1 wherein said tuner control means comprises search means responsive to said electrical detection signal for adjusting said tuner control signal and for searching for the minimum transmission wavelength of each of said sensor means to be illuminated.

8. The optical sensor diagnostic system of claim 1 wherein:
said tuner control means comprises means for scanning said tuner control signal so as to cause said tunable light source to scan across the minimum transmission wavelengths of all of said sensor means; and
said signal processing means comprises means responsive to said tuner control signal for determining the current wavelength of said tunable light from the magnitude of said tuner control signal and for determining which of said sensor means is being illuminated, thereby determining said shift in said minimum transmission wavelength.

9. The optical sensor diagnostic system of claim 1 wherein:
said tuner control means comprises means for scanning said tuner control signal so as to cause said tunable light source to scan across the minimum transmission wavelengths of all of said sensor means and for providing a synchronization signal indicative of when said tuner control signal begins said scanning; and
said signal processing means comprises means responsive to said synchronization signal for determining which of said sensor means is being illuminated, thereby determining said shift in said minimum transmission wavelength.

10. The optical sensor diagnostic system of claim 1 wherein said at least one sensor means comprises at least one Bragg grating.

11. An optical sensor diagnostic system, comprising:
tunable light source means for providing a wavelength-tunable light in response to a tuner control signal, said tunable light being launched into an optical waveguide;

at least one optical sensor means, disposed in the path of said tunable light, each providing a reflected light having an associated local-maximum peak reflection wavelength, said peak wavelength varying in response to a perturbation imposed on a corresponding sensor;

said tunable light source means for individually illuminating each of said sensor means at said associated peak wavelength;

optical isolation means, disposed in the path of said tunable light between said tunable light source means and said sensor means, for isolating said tunable light source means from said reflected light;

optical detection means, disposed in the path of said reflected light, for detecting said reflected light from each of said sensor means and for providing an electrical detection signal indicative of the power of said reflected light;

tuner control means for providing a variable voltage signal to said tunable light source means indicative of the desired wavelength of said tunable light; and signal processing means responsive to said electrical detection signal, for detecting a shift in said peak wavelength due to said perturbation, and for providing a signal indicative of said perturbation.

12. The optical sensor diagnostic system of claim 11 wherein said tuner control means comprises tracking means, responsive to said electrical detection signal, for adjusting said tuner control signal to allow said tunable light to track static shifts in said peak wavelength for each of said sensor means.

13. The optical sensor diagnostic system of claim 12 wherein said tuner control means comprises modulation means for modulating said tuner control signal at a predetermined modulation frequency.

14. The optical sensor diagnostic system of claim 13 wherein said signal processing means comprises demodulation means running at said modulation frequency, for demodulating said electrical detection signal and for providing a demodulation signal indicative thereof.

15. The optical sensor diagnostic system of claim 11 wherein said signal processing means comprises means for measuring the frequency and magnitude of dynamic changes in said peak reflection wavelength.

16. The optical sensor diagnostic system of claim 11 wherein said signal processing means comprises means for measuring static shifts in said peak transmission wavelength.

17. The optical sensor diagnostic system of claim 11 wherein said tuner control means comprises search means responsive to said electrical detection signal for adjusting said tuner control signal and for searching for the peak reflection wavelength of each of said sensor means to be illuminated.

18. The optical sensor diagnostic system of claim 11 wherein:
said tuner control means comprises means for scanning said tuner control signal so as to cause said tunable light source to scan across the peak reflection wavelengths of all of said sensor means; and
said signal processing means comprises means responsive to said tuner control signal for determining the current wavelength of said tunable light and for determining which of said sensor means is being illuminated, thereby determining said shift in said peak reflection wavelength of said reflected light.

19. The optical sensor diagnostic system of claim 11 wherein:
said tuner control means comprises means for scanning said tuner control signal so as to cause said tunable light source to scan across the peak reflection wavelengths of all of said sensor means; and for providing a synchronization signal indicative of when said tuner control signal begins said scanning; and
said signal processing means comprises means responsive to said synchronization signal for determining which of said sensor means is being illuminated, thereby determining said shift in said peak reflection wavelength of said reflected light.

20. The optical sensor diagnostic system of claim 11 wherein said at least one sensor means comprises at least one Bragg grating.

21. An optical sensor diagnostic system, comprising:
tunable light source means for providing a wavelength-tunable light in response to a tuner control signal, having a front variable-wavelength reflector delimiting one end of a cavity of said source means, said tunable light being launched into an optical waveguide;
at least one optical sensor means, disposed in the path of said tunable light, each sensor having an associated peak reflection wavelength, said peak wavelength varying in response to a perturbation imposed on a corresponding sensor, each sensor acting as a reflector for an associated coupled cavity between said front reflector and a corresponding one of said sensor means;
said coupled cavity resonating at said associated peak reflection wavelength and providing an output light indicative of said peak wavelength;
said perturbation causing said coupled cavity to detune thereby causing the power of said output light to change accordingly;
said tunable light source means for individually illuminating each of said sensor means at said associated peak reflection wavelength;
optical detection means, disposed in the path of said output light, for detecting said output light from each coupled cavity associated with each of said sensor means and for providing an electrical detection signal indicative of the power of said output light;
tuner control means for providing a variable voltage signal to said tunable light source means indicative of the desired wavelength of said tunable light; and
signal processing means responsive to said electrical detection signal, for detecting a shift in said peak wavelength due to said perturbation, and for providing a signal indicative of said perturbation for each of said sensor means.

22. The optical sensor diagnostic system of claim 21 wherein said tuner control means comprises tracking means, responsive to said electrical detection signal, for adjusting said tuner control signal to allow said tunable light to track static changes in said peak wavelength for each of said sensor means.

23. The optical sensor diagnostic system of claim 22 wherein said tuner control means comprises modulation means for modulating said tuner control signal at a predetermined modulation frequency.

24. The optical sensor diagnostic system of claim 23 wherein said signal processing means comprises demodulation means running at said modulation frequency, for demodulating said electrical detection signal and for providing a demodulation signal indicative thereof.

25. The optical sensor diagnostic system of claim 22 wherein said signal processing means comprises means for measuring the frequency and magnitude of dynamic changes in said peak reflection wavelength.

26. The optical sensor diagnostic system of claim 21 wherein said signal processing means comprises means for measuring static shifts in said peak transmission wavelength.

27. The optical sensor diagnostic system of claim 21 wherein said tuner control means comprises search means responsive to said electrical detection signal for adjusting said tuner control signal and for searching for the peak reflection wavelength of each of said sensor means to be illuminated.

28. The optical sensor diagnostic system of claim 21 wherein:
said tuner control means comprises means for scanning said tuner control signal so as to cause said tunable light source to scan across the peak reflection wavelengths of all of said sensor means; and
said signal processing means comprises means responsive to said tuner control signal for determining the current wavelength of said tunable light and for determining which of said sensor means is being illuminated, thereby determining said shift in said peak reflection wavelength of said reflected light.

29. The optical sensor diagnostic system of claim 21 wherein:
said tuner control means comprises means for scanning said tuner control signal so as to cause said tunable light source to scan across the peak reflection wavelengths of all of said sensor means; and for providing a synchronization signal indicative of when said tuner control signal begins said scanning; and
said signal processing means comprises means responsive to said synchronization signal for determining which of said sensor means is being illuminated, thereby determining said shift in said peak reflection wavelength of said reflected light.

30. The optical sensor diagnostic system of claim 21 wherein said at least one sensor means comprises at least one Bragg grating.

31. The optical sensor diagnostic system of claims 1, 11, or 21 wherein said perturbation is a strain on said sensor means.

* * * * *

UNITED STATES PATENT AND TRADEMARK OFFICE
CERTIFICATE OF CORRECTION

PATENT NO. : 5,401,956
DATED : March 28, 1995
INVENTOR(S) : James R. Dunphy et al.

It is certified that error appears in the above-indentified patent and that said Letters Patent is hereby corrected as shown below:

Title page showing the illustrated figure, should be deleted and substituted therefor the attached title page.

In the Drawings:

Please replace all five of the existing drawing sheets (Figs. 1-6) with five new drawing sheets (Figs. 1-6) attached hereto.

Signed and Sealed this

Fourth Day of June, 1996

Attest:

BRUCE LEHMAN

Attesting Officer   Commissioner of Patents and Trademarks

United States Patent [19]

Dunphy et al.

[11] Patent Number: 5,401,956
[45] Date of Patent: Mar. 28, 1995

[54] DIAGNOSTIC SYSTEM FOR FIBER GRATING SENSORS

[75] Inventors: James R. Dunphy, Glastonbury; Kenneth P. Falkowich, Coventry, both of Conn.

[73] Assignee: United Technologies Corporation, Hartford, Conn.

[21] Appl. No.: 129,217

[22] Filed: Sep. 29, 1993

[51] Int. Cl.⁶ .............................................. H01J 5/16
[52] U.S. Cl. ............................. 250/227.18; 250/227.23
[58] Field of Search ......................... 250/227.18, 227.23

[56] References Cited

U.S. PATENT DOCUMENTS

| 4,761,073 | 8/1988 | Meltz et al. | 356/32 |
| 4,806,012 | 2/1989 | Meltz et al. | 356/32 |
| 4,985,624 | 1/1991 | Spillman, Jr. | 250/227.23 |
| 5,323,224 | 6/1994 | Wada | 250/227.18 |

FOREIGN PATENT DOCUMENTS

RM93A0005-97  9/1993  Italy .

Primary Examiner—William L. Sikes
Assistant Examiner—James Dudek
Attorney, Agent, or Firm—Gerald L. DePardo

[57] ABSTRACT

An optical sensor diagnostic system includes a tunable narrow wavelength-band source 9 which provides a variable wavelength light 44 into an optical fiber 32,52. Reflective sensors 54,58, such as Bragg gratings, are disposed along the fiber 52 in the path of the variable light 44. The sensors 54,58 transmit light 56,60 having a minimum transmission wavelength which varies due to a perturbation, such as strain, imposed thereon. A tuner control circuit 42 drives the tunable light source 9 to cause the source light 44 to scan across a predetermined wavelength range to illuminate each sensor at its minimum transmission wavelength. The power of the transmitted light is converted to an electrical signal by a detector 64 and monitored by a signal processor 68 which detects drops in transmitted power level and provides output signals on lines 71 indicative of the perturbation for each sensor. The system may be configured in open loop mode to measure static strains, or closed loop mode to track static strains and measure dynamic strains. Also, the system may be used in a Fabry-Perot configuration to provide a very sensitive strain detection system. Further, the system may be configured in reflection or transmission mode.

31 Claims, 5 Drawing Sheets

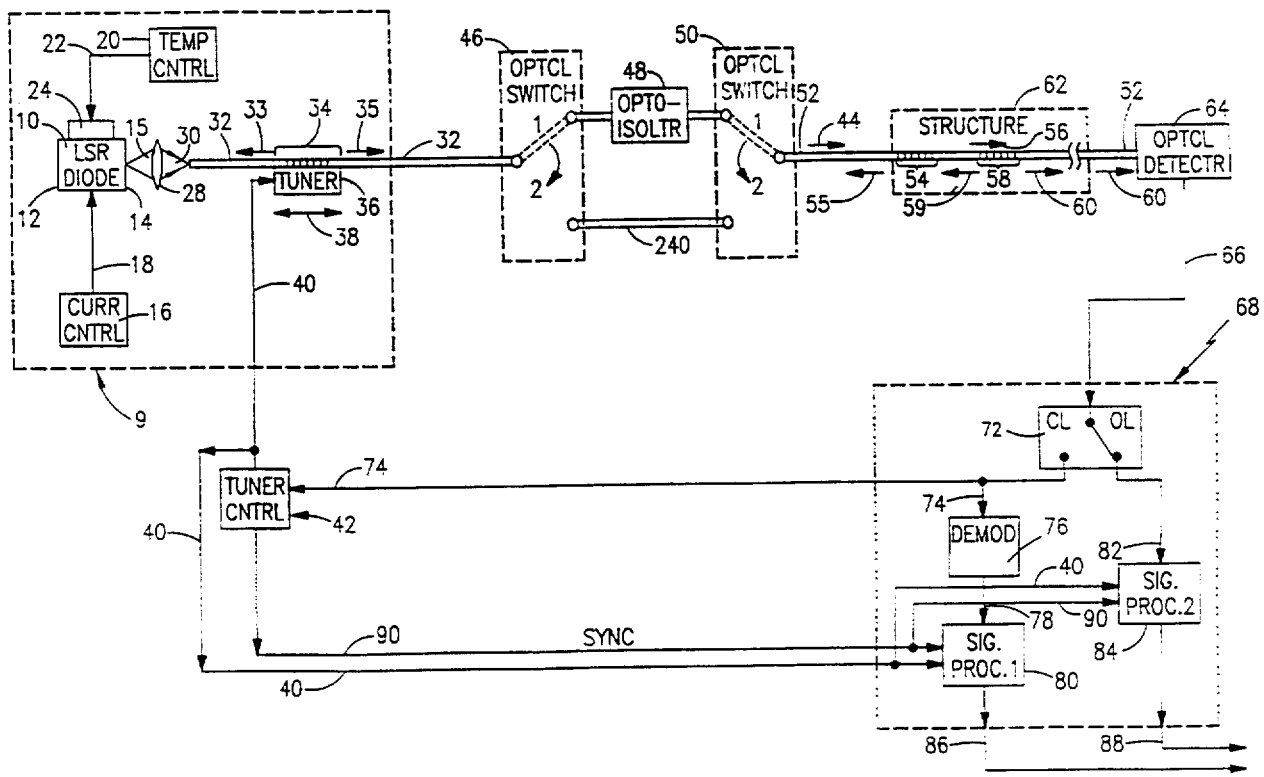

UNITED STATES PATENT AND TRADEMARK OFFICE
CERTIFICATE OF CORRECTION

PATENT NO. : 5,401,956   Page 3 of 7

DATED : March 28, 1995

INVENTOR(S) : James R. Dunphy et al.

It is certified that error appears in the above-indentified patent and that said Letters Patent is hereby corrected as shown below:

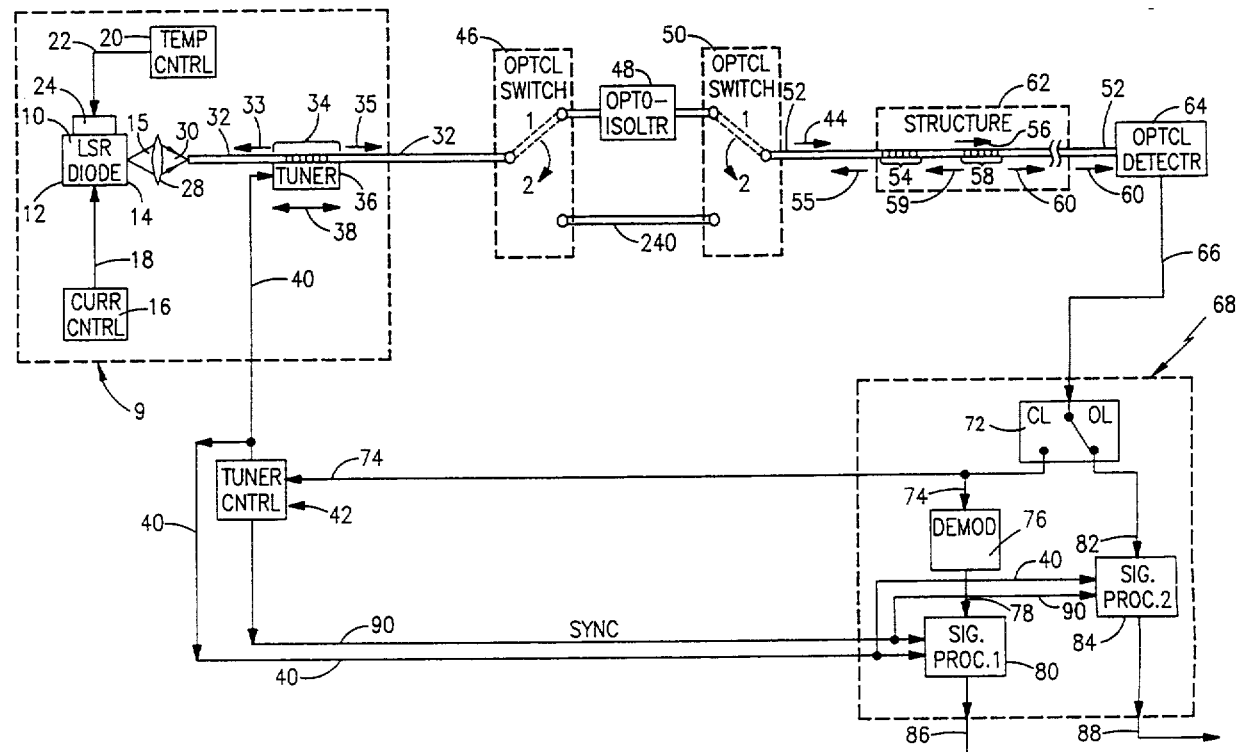

FIG.1

Sheet 1 of 5

UNITED STATES PATENT AND TRADEMARK OFFICE
CERTIFICATE OF CORRECTION

PATENT NO. : 5,401,956

DATED : March 28, 1995

INVENTOR(S) : James R. Dunphy et al.

It is certified that error appears in the above-indentified patent and that said Letters Patent is hereby corrected as shown below:

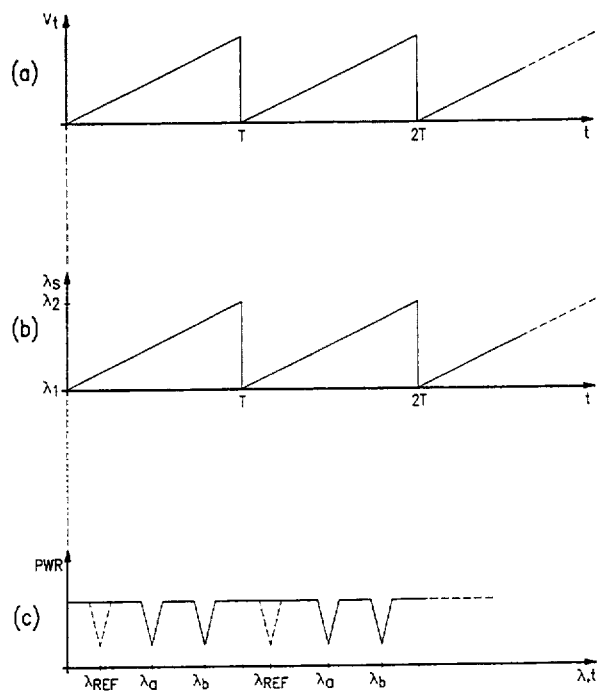

UNITED STATES PATENT AND TRADEMARK OFFICE
CERTIFICATE OF CORRECTION

PATENT NO. : 5,401,956　　　　　　　　　　　　　　　Page 5 of 7
DATED　　　 : March 28, 1995
INVENTOR(S) : James R. Dunphy et al.

It is certified that error appears in the above-indentified patent and that said Letters Patent is hereby corrected as shown below:

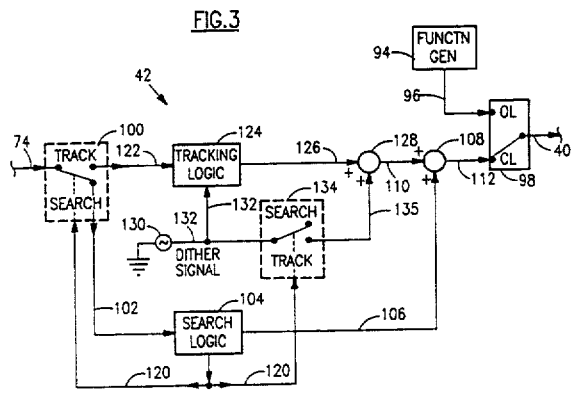

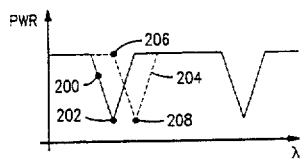

Sheet 3 of 5

UNITED STATES PATENT AND TRADEMARK OFFICE
CERTIFICATE OF CORRECTION

PATENT NO. : 5,401,956                              Page 6 of 7
DATED      : March 28, 1995
INVENTOR(S): James R. Dunphy et al.

It is certified that error appears in the above-indentified patent and that said Letters Patent is hereby corrected as shown below:

FIG.5

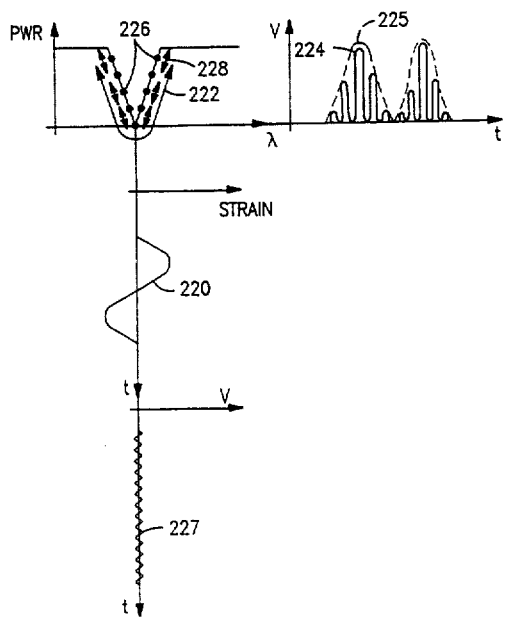

Sheet 4 of 5

UNITED STATES PATENT AND TRADEMARK OFFICE
CERTIFICATE OF CORRECTION

PATENT NO. : 5,401,956
DATED : March 28, 1995
INVENTOR(S) : James R. Dunphy et al.

It is certified that error appears in the above-indentified patent and that said Letters Patent is hereby corrected as shown below:

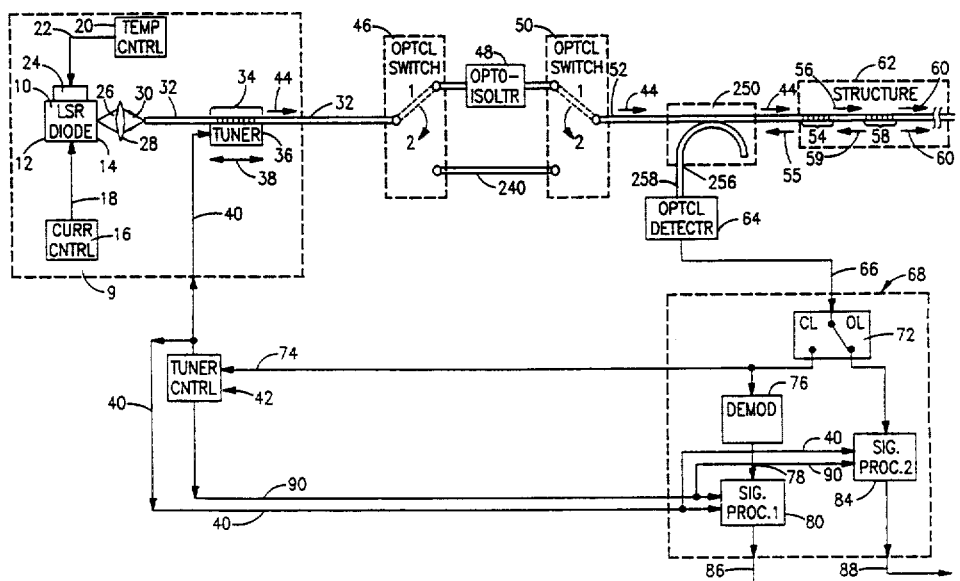

FIG.6